US009769623B2

(12) United States Patent
Fix et al.

(10) Patent No.: US 9,769,623 B2
(45) Date of Patent: *Sep. 19, 2017

(54) REFERENCE BASED LOCATION INFORMATION FOR A WIRELESS NETWORK

(71) Applicants: AT&T Mobility II LLC, Atlanta, GA (US); AT&T INTELLECTUAL PROPERTY I, L.P., Atlanta, GA (US)

(72) Inventors: Jeremy Fix, Acworth, GA (US); Andrew G. Hume, Mission Viejo, CA (US); Sheldon Kent Meredith, Marietta, GA (US)

(73) Assignees: AT&T MOBILITY II LLC, Atlanta, GA (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/261,841

(22) Filed: Sep. 9, 2016

(65) Prior Publication Data
US 2016/0381512 A1 Dec. 29, 2016

Related U.S. Application Data

(63) Continuation of application No. 14/566,657, filed on Dec. 10, 2014, now Pat. No. 9,473,897, which is a
(Continued)

(51) Int. Cl.
H04W 4/02 (2009.01)
G01S 5/02 (2010.01)
H04W 64/00 (2009.01)

(52) U.S. Cl.
CPC .......... H04W 4/028 (2013.01); G01S 5/0252 (2013.01); H04W 64/00 (2013.01)

(58) Field of Classification Search
CPC .......... H04W 4/02; H04W 4/025; H04W 4/04; H04W 64/00; H04W 4/028; G01S 5/0252
(Continued)

(56) References Cited

U.S. PATENT DOCUMENTS 4,718,081 A   1/1988  Brenig
5,515,062 A   5/1996  Maine et al.
(Continued)

FOREIGN PATENT DOCUMENTS

EP   0856746 A2   8/1998
EP   1145526      10/2001
(Continued)

OTHER PUBLICATIONS

3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.
(Continued)

Primary Examiner — Nathan Taylor
(74) Attorney, Agent, or Firm — Amin, Turocy & Watson, LLP

(57) ABSTRACT

Determining referenced based location information for a wireless radio network is described. Referenced based location information can include determining location reference information and corresponding location offset information based on location information. In an aspect, location information can be timed fingerprint location information. Location offset information can be communicated in a wireless network at a lower operational cost than the associated location information. As such, use of referenced based location information for a wireless network can reduce bandwidth consumption as compared to location information communicated at similar intervals. This is particularly
(Continued)

true in large wireless networks. Moreover, the use of referenced based location information for determining timed fingerprint location information can be highly attractive in light of timed fingerprint location information facilitating location information for many non-GPS enabled devices and being associated with significant increases in the frequency and density of location event requests.

20 Claims, 10 Drawing Sheets

Related U.S. Application Data continuation of application No. 13/523,770, filed on Jun. 14, 2012, now Pat. No. 8,938,258.

(58) Field of Classification Search
USPC ............ 455/456.1–456.4, 406; 370/353, 444
See application file for complete search history.

(56) References Cited

U.S. PATENT DOCUMENTS

| | | | |
|---|---|---|---|
| 5,724,660 A | 3/1998 | Kauser et al. | |
| 5,732,354 A | 3/1998 | MacDonald | |
| 5,732,383 A | 3/1998 | Foladare et al. | |
| 5,831,545 A | 11/1998 | Murray et al. | |
| 5,844,521 A * | 12/1998 | Stephens | H04B 7/1855 342/357.2 |
| 5,982,324 A | 11/1999 | Watters et al. | |
| 6,018,312 A * | 1/2000 | Haworth | G01S 1/026 342/353 |
| 6,026,301 A | 2/2000 | Satarasinghe | |
| 6,058,260 A | 5/2000 | Brockel et al. | |
| 6,108,532 A | 8/2000 | Matsuda et al. | |
| 6,108,556 A * | 8/2000 | Ito | G01S 5/0036 455/456.2 |
| 6,125,125 A | 9/2000 | Narasimha et al. | |
| 6,148,219 A | 11/2000 | Engelbrecht et al. | |
| 6,216,002 B1 | 4/2001 | Holmring | |
| 6,230,018 B1 | 5/2001 | Watters et al. | |
| 6,256,577 B1 | 7/2001 | Graunke | |
| 6,263,190 B1 | 7/2001 | Mamori et al. | |
| 6,292,665 B1 | 9/2001 | Hildebrand et al. | |
| 6,298,233 B1 | 10/2001 | Souissi et al. | |
| 6,307,503 B1 | 10/2001 | Liu et al. | |
| 6,311,078 B1 | 10/2001 | Hardouin et al. | |
| 6,317,686 B1 | 11/2001 | Ran | |
| 6,321,092 B1 | 11/2001 | Fitch et al. | |
| 6,330,459 B1 | 12/2001 | Crichton et al. | |
| 6,351,235 B1 | 2/2002 | Stilp | |
| 6,353,778 B1 | 3/2002 | Brown et al. | |
| 6,397,074 B1 | 5/2002 | Pihl et al. | |
| 6,405,047 B1 | 6/2002 | Moon | |
| 6,407,703 B1 | 6/2002 | Minter et al. | |
| 6,429,815 B1 | 8/2002 | Soliman | |
| 6,434,396 B1 | 8/2002 | Rune | |
| 6,449,486 B1 | 9/2002 | Rao | |
| 6,453,168 B1 | 9/2002 | McCrady et al. | |
| 6,493,539 B1 | 12/2002 | Falco et al. | |
| 6,515,623 B2 | 2/2003 | Johnson | |
| 6,522,296 B2 | 2/2003 | Holt | |
| 6,526,335 B1 * | 2/2003 | Treyz | G01C 21/26 307/10.1 |
| 6,552,682 B1 | 4/2003 | Fan | |
| 6,560,532 B2 | 5/2003 | Cayford | |
| 6,560,567 B1 | 5/2003 | Yechuri et al. | |
| 6,594,576 B2 | 7/2003 | Fan et al. | |
| 6,604,083 B1 | 8/2003 | Bailey et al. | |
| 6,668,226 B2 | 12/2003 | Sutanto et al. | |
| 6,690,292 B1 | 2/2004 | Meadows et al. | |
| 6,744,383 B1 | 6/2004 | Alfred et al. | |
| 6,744,740 B2 | 6/2004 | Chen | |
| 6,757,545 B2 | 6/2004 | Nowak et al. | |
| 6,801,782 B2 | 10/2004 | McCrady et al. | |
| 6,801,855 B1 | 10/2004 | Walters et al. | |
| 6,816,782 B1 | 11/2004 | Walters et al. | |
| 6,850,761 B2 | 2/2005 | Pallonen | |
| 6,892,054 B2 | 5/2005 | Belcher et al. | |
| 6,915,123 B1 | 7/2005 | Daudelin et al. | |
| 6,933,100 B2 | 8/2005 | Igawa et al. | |
| 6,933,860 B1 | 8/2005 | Gehman et al. | |
| 7,058,710 B2 | 6/2006 | McCall et al. | |
| 7,065,349 B2 | 6/2006 | Nath et al. | |
| 7,098,805 B2 | 8/2006 | Meadows et al. | |
| 7,113,793 B2 | 9/2006 | Veerasamy et al. | |
| 7,149,534 B2 | 12/2006 | Bloebaum et al. | |
| 7,181,218 B2 | 2/2007 | Ovesjo et al. | |
| 7,203,752 B2 | 4/2007 | Rice et al. | |
| 7,277,049 B2 | 10/2007 | Korneluk et al. | |
| 7,289,039 B2 | 10/2007 | Kato et al. | |
| 7,346,359 B2 | 3/2008 | Damarla et al. | |
| 7,359,719 B1 | 4/2008 | Duffett-Smith et al. | |
| 7,366,492 B1 | 4/2008 | Ganesh | |
| 7,375,649 B2 | 5/2008 | Gueziec | |
| 7,420,464 B2 | 9/2008 | Fitzgerald et al. | |
| 7,432,829 B2 | 10/2008 | Poltorak | |
| 7,436,794 B2 | 10/2008 | Takahashi et al. | |
| 7,463,143 B2 | 12/2008 | Forr et al. | |
| 7,508,321 B2 | 3/2009 | Gueziec | |
| 7,664,492 B1 | 2/2010 | Lee et al. | |
| 7,696,922 B2 | 4/2010 | Nicholson et al. | |
| 7,697,917 B2 | 4/2010 | Camp et al. | |
| 7,706,964 B2 | 4/2010 | Horvitz et al. | |
| 7,744,740 B2 | 6/2010 | Diehl | |
| 7,747,258 B2 | 6/2010 | Farmer et al. | |
| 7,761,225 B2 | 7/2010 | Vaughn | |
| 7,831,380 B2 | 11/2010 | Chapman et al. | |
| 7,848,880 B2 | 12/2010 | Cheung | |
| 7,890,299 B2 | 2/2011 | Fok et al. | |
| 7,917,156 B2 | 3/2011 | Sheynblat et al. | |
| 7,945,271 B1 * | 5/2011 | Barnes | H04W 64/00 455/115.3 |
| 7,958,001 B2 | 6/2011 | Abbadessa et al. | |
| 7,962,162 B2 | 6/2011 | McNair | |
| 7,962,280 B2 | 6/2011 | Kindo et al. | |
| 7,994,981 B1 | 8/2011 | Farrokhi et al. | |
| 7,996,020 B1 | 8/2011 | Chhabra | |
| 8,000,726 B2 | 8/2011 | Altman et al. | |
| 8,005,050 B2 | 8/2011 | Scheinert et al. | |
| 8,010,164 B1 | 8/2011 | Sennett et al. | |
| 8,036,822 B2 | 10/2011 | Ho et al. | |
| 8,050,690 B2 | 11/2011 | Neeraj | |
| 8,054,802 B2 | 11/2011 | Burgess et al. | |
| 8,065,185 B2 | 11/2011 | Foladare et al. | |
| 8,098,152 B2 | 1/2012 | Zhang et al. | |
| 8,121,604 B1 | 2/2012 | Schwinghammer | |
| 8,126,479 B2 | 2/2012 | Morrison | |
| 8,140,079 B2 | 3/2012 | Olson | |
| 8,193,984 B2 | 6/2012 | Ward et al. | |
| 8,194,589 B2 * | 6/2012 | Wynn | H04L 63/0428 370/328 |
| 8,195,175 B2 | 6/2012 | Govindan et al. | |
| 8,224,349 B2 | 7/2012 | Meredith et al. | |
| 8,253,559 B2 | 8/2012 | Howard et al. | |
| 8,254,959 B2 | 8/2012 | Fix et al. | |
| 8,264,956 B2 | 9/2012 | Ramankutty et al. | |
| 8,270,933 B2 | 9/2012 | Riemer et al. | |
| 8,280,438 B2 | 10/2012 | Barbera et al. | |
| 8,295,854 B2 | 10/2012 | Osann et al. | |
| 8,300,663 B2 * | 10/2012 | Chion | H04L 1/1829 370/474 |
| 8,307,030 B1 | 11/2012 | Hu | |
| 8,326,682 B2 | 12/2012 | Redford et al. | |
| 8,355,364 B1 | 1/2013 | Vargantwar et al. | |
| 8,355,865 B2 | 1/2013 | Wagner et al. | |
| 8,417,264 B1 | 4/2013 | Whitney et al. | |
| 8,469,274 B2 | 6/2013 | Tseng et al. | |
| 8,548,494 B2 | 10/2013 | Agarwal et al. | |
| 8,572,198 B2 | 10/2013 | Jhanji | |
| 8,594,700 B2 | 11/2013 | Nabbefeld | |
| 8,611,919 B2 | 12/2013 | Barnes | |
| 8,612,410 B2 | 12/2013 | Meredith et al. | |

(56) References Cited

U.S. PATENT DOCUMENTS

| | | | |
|---|---|---|---|
| 8,666,388 B2 | 3/2014 | Catovic et al. |
| 8,666,390 B2 | 3/2014 | Meredith et al. |
| 8,761,799 B2 | 6/2014 | Meredith et al. |
| 8,897,805 B2 | 11/2014 | Fix et al. |
| 8,909,247 B2 | 12/2014 | Tipton et al. |
| 8,923,134 B2 | 12/2014 | Meredith et al. |
| 8,929,827 B2 | 1/2015 | Fix et al. |
| 9,008,684 B2 | 4/2015 | Tipton et al. |
| 9,008,698 B2 | 4/2015 | Meredith et al. |
| 9,232,399 B2 | 1/2016 | Tipton et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1* | 6/2002 | Havinis ............... H04W 4/02 455/456.6 |
| 2002/0172223 A1 | 11/2002 | Stilp et al. |
| 2003/0040323 A1 | 2/2003 | Pihl et al. |
| 2003/0092448 A1 | 5/2003 | Forstrom et al. |
| 2003/0095065 A1 | 5/2003 | Ericson et al. |
| 2003/0097330 A1 | 5/2003 | Hillmer et al. |
| 2003/0115228 A1 | 6/2003 | Horvitz et al. |
| 2003/0115260 A1 | 6/2003 | Edge |
| 2003/0125046 A1 | 7/2003 | Riley et al. |
| 2003/0158924 A1 | 8/2003 | DeLegge |
| 2003/0222819 A1 | 12/2003 | Karr et al. |
| 2003/0225508 A9 | 12/2003 | Petzld et al. |
| 2004/0023664 A1* | 2/2004 | Mirouze ............... G09F 27/00 455/456.1 |
| 2004/0024639 A1 | 2/2004 | Goldman et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2004/0267410 A1 | 12/2004 | Duri et al. |
| 2004/0267561 A1 | 12/2004 | Meshkin et al. |
| 2005/0007993 A1 | 1/2005 | Chambers et al. |
| 2005/0039056 A1* | 2/2005 | Bagga ............... G06F 21/31 726/19 |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner et al. |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0200303 A1 | 9/2006 | Fuentes et al. |
| 2006/0233133 A1* | 10/2006 | Liu ............... H04L 29/12103 370/329 |
| 2006/0240839 A1 | 10/2006 | Chen et al. |
| 2006/0240841 A1 | 10/2006 | Bhattacharya |
| 2006/0246918 A1 | 11/2006 | Fok et al. |
| 2006/0267841 A1 | 11/2006 | Lee et al. |
| 2006/0270419 A1 | 11/2006 | Crowly et al. |
| 2006/0282660 A1 | 12/2006 | Varghese et al. |
| 2007/0001873 A1 | 1/2007 | Ishikawa et al. |
| 2007/0049286 A1 | 3/2007 | Kim et al. |
| 2007/0060130 A1* | 3/2007 | Gogic ............... G01S 5/0252 455/440 |
| 2007/0088818 A1 | 4/2007 | Roberts et al. |
| 2007/0121560 A1 | 5/2007 | Edge |
| 2007/0149214 A1 | 6/2007 | Walsh et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1* | 9/2007 | Fujiwara ............... G01S 5/0205 370/338 |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0032705 A1 | 2/2008 | Patel et al. |
| 2008/0039114 A1 | 2/2008 | Phatak et al. |
| 2008/0056193 A1* | 3/2008 | Bourlas ............ H04W 74/0875 370/331 |
| 2008/0070593 A1 | 3/2008 | Altman et al. |
| 2008/0071466 A1 | 3/2008 | Downs et al. |
| 2008/0076450 A1* | 3/2008 | Nanda ............... G01D 21/00 455/456.1 |
| 2008/0096566 A1 | 4/2008 | Brunner et al. |
| 2008/0127354 A1 | 5/2008 | Carpenter et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1* | 11/2008 | Carlson ............... G01S 5/12 455/456.1 |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0005064 A1 | 1/2009 | Malik et al. |
| 2009/0017823 A1 | 1/2009 | Sachs et al. |
| 2009/0024546 A1 | 1/2009 | Ficcaglia et al. |
| 2009/0028082 A1* | 1/2009 | Wynn ............... H04L 63/0428 370/310 |
| 2009/0052330 A1 | 2/2009 | Matsunaga et al. |
| 2009/0079622 A1 | 3/2009 | Seshadri et al. |
| 2009/0104917 A1* | 4/2009 | Ben Rached ......... H04W 64/00 455/456.1 |
| 2009/0117907 A1* | 5/2009 | Wigren ............... H04W 64/00 455/440 |
| 2009/0125380 A1 | 5/2009 | Otto et al. |
| 2009/0131073 A1 | 5/2009 | Carlson et al. |
| 2009/0177382 A1 | 7/2009 | Alles et al. |
| 2009/0181695 A1* | 7/2009 | Wirola ............... G01S 5/0252 455/456.1 |
| 2009/0227265 A1* | 9/2009 | Kang ............... H04W 60/04 455/456.1 |
| 2009/0234876 A1 | 9/2009 | Schigel et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0312005 A1 | 12/2009 | Mukundan et al. |
| 2009/0327134 A1 | 12/2009 | Carlson et al. |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0056179 A1 | 3/2010 | Gaenger et al. |
| 2010/0058442 A1 | 3/2010 | Costa et al. |
| 2010/0081389 A1 | 4/2010 | Lawrow et al. |
| 2010/0094758 A1 | 4/2010 | Chamberlain et al. |
| 2010/0100732 A1* | 4/2010 | Hatakeyama ......... G06Q 20/401 713/161 |
| 2010/0113035 A1 | 5/2010 | Eskicioglu et al. |
| 2010/0120447 A1 | 5/2010 | Anderson et al. |
| 2010/0122314 A1 | 5/2010 | Zhang et al. |
| 2010/0124886 A1 | 5/2010 | Fordham et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1* | 6/2010 | Shkedi ............... H04W 4/023 455/456.1 |
| 2010/0163632 A1 | 7/2010 | Tseng |
| 2010/0172259 A1 | 7/2010 | Aggarwal et al. |
| 2010/0180039 A1 | 7/2010 | Oh et al. |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |

(56) References Cited

U.S. PATENT DOCUMENTS

| | | |
|---|---|---|
| 2010/0273504 A1 | 10/2010 | Bull et al. |
| 2010/0291907 A1 | 11/2010 | MacNaughtan et al. |
| 2010/0296467 A1* | 11/2010 | Pelletier ............. H04W 74/002 370/329 |
| 2010/0299060 A1 | 11/2010 | Snavely et al. |
| 2010/0311437 A1 | 12/2010 | Palanki et al. |
| 2010/0313157 A1 | 12/2010 | Carlsson et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0026475 A1* | 2/2011 | Lee ......................... H04L 5/001 370/329 |
| 2011/0026495 A1* | 2/2011 | Lee ......................... H04L 5/001 370/335 |
| 2011/0039593 A1* | 2/2011 | Lee ......................... H04L 5/001 455/515 |
| 2011/0053609 A1 | 3/2011 | Grogan et al. |
| 2011/0060808 A1* | 3/2011 | Martin ................ G06F 17/3087 709/217 |
| 2011/0065450 A1 | 3/2011 | Kazmi |
| 2011/0069668 A1* | 3/2011 | Chion ................... H04L 1/1829 370/329 |
| 2011/0072034 A1 | 3/2011 | Sly |
| 2011/0076975 A1 | 3/2011 | Kim et al. |
| 2011/0077030 A1 | 3/2011 | Wigren et al. |
| 2011/0077032 A1 | 3/2011 | Correale et al. |
| 2011/0099047 A1 | 4/2011 | Weiss et al. |
| 2011/0106416 A1 | 5/2011 | Scofield et al. |
| 2011/0130135 A1 | 6/2011 | Trigui |
| 2011/0151839 A1 | 6/2011 | Bolon et al. |
| 2011/0161261 A1 | 6/2011 | Wu et al. |
| 2011/0164596 A1* | 7/2011 | Montemurro ....... H04W 76/021 370/338 |
| 2011/0171912 A1 | 7/2011 | Beck et al. |
| 2011/0172905 A1 | 7/2011 | Schroder et al. |
| 2011/0205964 A1* | 8/2011 | Fix ........................ G01S 5/0252 370/328 |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1* | 10/2011 | Siomina ................ G01S 5/0268 455/456.1 |
| 2011/0256874 A1 | 10/2011 | Hayama et al. |
| 2011/0271331 A1 | 11/2011 | Adams |
| 2011/0287801 A1 | 11/2011 | Levin et al. |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1* | 2/2012 | Richey .................. H04W 4/023 340/539.13 |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052883 A1 | 3/2012 | Austin et al. |
| 2012/0052884 A1 | 3/2012 | Bogatin |
| 2012/0062415 A1 | 3/2012 | Hwang et al. |
| 2012/0087338 A1 | 4/2012 | Brandt et al. |
| 2012/0099621 A1 | 4/2012 | Karlsson et al. |
| 2012/0115505 A1 | 5/2012 | Miyake et al. |
| 2012/0139782 A1 | 6/2012 | Gutt et al. |
| 2012/0144452 A1 | 6/2012 | Dyor et al. |
| 2012/0144457 A1 | 6/2012 | Counterman |
| 2012/0158289 A1* | 6/2012 | Bernheim Brush ................ G01C 21/3484 701/425 |
| 2012/0182180 A1 | 7/2012 | Wolf et al. |
| 2012/0182874 A1 | 7/2012 | Siomina et al. |
| 2012/0185309 A1 | 7/2012 | Kakarla et al. |
| 2012/0214509 A1 | 8/2012 | Levin et al. |
| 2012/0221232 A1 | 8/2012 | Shang et al. |
| 2012/0287911 A1 | 11/2012 | Takano et al. |
| 2012/0302254 A1 | 11/2012 | Charbit et al. |
| 2012/0317500 A1 | 12/2012 | Kosseifi et al. |
| 2012/0323703 A1 | 12/2012 | Hillier et al. |
| 2012/0327869 A1 | 12/2012 | Wang et al. |
| 2013/0007058 A1 | 1/2013 | Meredith et al. |
| 2013/0023237 A1 | 1/2013 | Meredith et al. |
| 2013/0023247 A1 | 1/2013 | Bolon et al. |
| 2013/0023274 A1 | 1/2013 | Meredith et al. |
| 2013/0023281 A1 | 1/2013 | Meredith et al. |
| 2013/0053057 A1 | 2/2013 | Cansino et al. |
| 2013/0066748 A1 | 3/2013 | Long |
| 2013/0095861 A1 | 4/2013 | Li et al. |
| 2013/0096966 A1 | 4/2013 | Barnes |
| 2013/0109407 A1 | 5/2013 | Tipton et al. |
| 2013/0114464 A1 | 5/2013 | Tarraf et al. |
| 2013/0122863 A1* | 5/2013 | Chen .................... H04W 12/06 455/411 |
| 2013/0137464 A1 | 5/2013 | Kramer et al. |
| 2013/0226451 A1 | 8/2013 | O'Neill et al. |
| 2013/0281111 A1 | 10/2013 | Syrjarinne et al. |
| 2013/0288704 A1 | 10/2013 | Wirola et al. |
| 2013/0310075 A1 | 11/2013 | Lim et al. |
| 2013/0324149 A1 | 12/2013 | Fix et al. |
| 2013/0337824 A1 | 12/2013 | Meredith et al. |
| 2013/0337826 A1* | 12/2013 | Fix ........................ G01S 5/0252 455/456.1 |
| 2014/0062782 A1 | 3/2014 | Abraham |
| 2014/0106779 A1 | 4/2014 | Arslan et al. |
| 2014/0122220 A1 | 5/2014 | Bradley et al. |
| 2014/0171060 A1 | 6/2014 | Cook et al. |
| 2014/0278744 A1 | 9/2014 | Lo Faro et al. |
| 2014/0295881 A1 | 10/2014 | Werner et al. |
| 2015/0011249 A1 | 1/2015 | Siliski et al. |

FOREIGN PATENT DOCUMENTS

| | | |
|---|---|---|
| JP | 2004069609 A | 3/2004 |
| JP | 2005091303 A | 4/2005 |
| JP | 2007328050 A | 12/2007 |
| WO | WO2006031035 A1 | 3/2006 |

OTHER PUBLICATIONS

3rd Generation Partnership Project, Technical Specification, "Group Radio Access Network, UTRAN Iuh interface Home Node B Application Part (HNBAP) signalling (Release 8)", 3GPP TS 25.469 V8.0.0 (Dec. 2008), last viewed Jul. 1, 2009, 56 pages.

Sullivan, Mark. "Signs and Wonders: Is AT&T Stepping Up Its Game?" PC World, Dec. 10, 2009, 1 page.

ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.

ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.

New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.

Cortes, et al. "Support-Vector Networks", Machine Learning, 20, 1995. http://www.springerlink.com/content/k238jx04hm87j80g/fulltext.pdf. Last accessed Dec. 24, 2010, 25 pages.

ACM Website, Press release of Mar. 17, 2009. http://www.acm.org/press-room/news-releases/pdfs/awards-08-groupa1.pdf. Last accessed Dec. 24, 2010, 3 pages.

Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary?doi=10.1.1.21.3818. Last accessed Dec. 24, 2010, 9 pages.

Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec. 24, 2010, 16 pages.

(56) References Cited

OTHER PUBLICATIONS

Drucker, et al. Support Vector Regression Machines.http://scholar.google.com/scholar?q=%22Support+Vector+Regression+Machines.%22. Last accessed Dec. 24, 2010, 7 pages.

Suykens, et al., "Least squares support vector machine classifiers", Neural Processing Letters, vol. 9, No. 3, Jun. 1999, pp. 293-300.

Ferris, et al (2002). "Interior-point methods for massive support vector machines". SIAM Journal on Optimization 13: 783-804. doi:10.1137/S1052623400374379, Date: 2002.

Meyer, et al. "The support vector machine under test." Neurocomputing 55(1-2): 169-186, 2003.

International Search Report for PCT Application No. US2011/026122, dated Sep. 10, 2011, 11 pages.

International Search Report for PCT Application No. US2011/026120, dated Sep. 9, 2011, 13 pages.

Charitanetra et al. "Mobile positioning location using E-OTD method for GSM network" Research and Development, 2003. Proceedings Student Conference on Putrajaya, Malaysia Aut. 25-26, 2003, pp. 319-324.

"Location Labs Powers Location-based Fraud Detection", All Points Blog, http://webcache.googleusercontent.com/search?hl=en&rtz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.

"Location Based Fraud Detection", Finsphere Corporation, 2008-2010.

Fleishman. Using the Personal Hotspot on your AT & T iPhone. Published online Mar. 15, 2011. http://www.macworld.com/article/158556/2011/03/personal_hotspot_att . . . , 4 pages.

Fleischfresser. Never Stop at a Red-Light Again. Published online Aug. 30, 2011. http://www.smartplanet.com/blog/ . . . , 2 pages.

Cellphone Networks and the Future of Traffic. Published online Mar. 2, 2011. http://m.wired.com/autopia/2011/03/cell-phone-networks-and-the-future- . . . 15 pages.

Intelligent Transportation System. Published online http://en.wikipedia.org/wiki/Intelligent_transportation_system, retrieved on Aug. 15, 2011, 7 pages.

Koukoumidis Emmanouil, Peh Li-Shiuan, Martonosi Margaret, SignalGuru: Leveraging Mobile Phones for Collaborative Traffic Signal Schedule Advisory, MobiSys'11, Jun. 28-Jul. 1, 2011, Bethesda, Maryland, USA. 14 pages.

Bitcarrier Technology. Published online at http://www.bitcarrier.com/technology, retrieved on Aug. 15, 2011, 1 page.

Hao Peng, Ban Xuegang(Jeff). Estimating Vehicle Position in a Queue at Signalized Intersections Using Simple Travel Times from Mobile Sensors, retrieved Nov. 18, 2011. 6 pages.

Ban Xuegang(Jeff), Gruteser Marco. Mobile Sensor as Traffic Probes: Addressing Transportation Modeling and Privacy Protection in an Integrated Framework, dated Jan. 10, 2010, 17 pages.

Office Action for U.S. Appl. No. 12/836,471 dated Dec. 28, 2011, 34 pages.

Office Action dated Feb. 23, 2012 for U.S. Appl. No. 12/967,747, 31 pages.

Office Action dated Dec. 15, 2011 for U.S. Appl. No. 12/712,424, 34 pages.

Office Action dated Apr. 13, 2012 for U.S. Appl. No. 12/416,853, 36 pages.

Office Action dated Oct. 2, 2012 for U.S. Appl. No. 13/554,285, 19 pages.

Office Action dated Aug. 30, 2012 for U.S. Appl. No. 12/958,146, 40 pages.

MobileLutions Introduces MobiLoc—A Breakthrough Technology to Control Texting in the Mobile Workplace. Press release Oct. 10, 2010 by MobileLutions. 2 pages.

DriveAssist Frequently Ask question by Aegis Mobility, Wayback archive Jul. 12, 2010, 2 pages.

Office Action dated Jul. 30, 2012 for U.S. Appl. No. 12/967,747, 28 pages.

Office Action dated Jul. 17, 2012 for U.S. Appl. No. 13/220,083, 57 pages.

Office Action dated Sep. 11, 2012 for U.S. Appl. No. 13/188,345, 44 pages.

Office Action dated Oct. 15, 2012 for U.S. Appl. No. 13/523,778, 21 pages.

Office Action dated Dec. 20, 2012 for U.S. Appl. No. 12/958,146, 23 pages.

Office Action dated Dec. 28, 2012 for U.S. Appl. No. 13/188,295, 37 pages.

Office Action dated Jan. 3, 2013 for U.S. Appl. No. 13/188,300, 36 pages.

Office Action dated Nov. 8, 2012 for U.S. Appl. No. 13/204,535, 30 pages.

Office Action dated Jan. 25, 2013, for U.S. Appl. No. 13/554,285, 20 pgs.

Office Action dated Mar. 19, 2013, for U.S. Appl. No. 13/174,541, 46 pgs.

Office Action dated Feb. 13, 2013, for U.S. Appl. No. 13/220,083, 48 pgs.

Office Action dated Feb. 22, 2013, for U.S. Appl. No. 13/188,345, 45 pgs.

Office Action dated Mar. 15, 2013, for U.S. Appl. No. 13/204,535, 18 pgs.

Office Action dated Mar. 19, 2013, for U.S. Appl. No. 13/284,497, 46 pgs.

Office Action dated Apr. 19, 2013, for U.S. Appl. No. 13/277,595, 58 pages.

Office Action dated Apr. 8, 2014 for U.S. Appl. No. 13/175,199, 52 Pages.

Office Action dated Apr. 23, 2014 for U.S. Appl. No. 13/291,917, 29 Pages.

Office Action dated Apr. 22, 2014 for U.S. Appl. No. 13/447,069, 51 Pages.

Office Action dated Sep. 20, 2012 for U.S. Appl. No. 12/870,254, 29 pages.

Office Action dated May 14, 2014 for U.S. Appl. No. 13/660,689, 62 pages.

Office Action dated May 9, 2014 for U.S. Appl. No. 13/188,136, 33 pages.

Squires, "Practical Physics", Cambridge University Press, p. 12, 1986, 3 pages.

Represent (2000). In Collins English dictionary. Retrieved on May 9, 2014 from http://search.credoreference.com/content/entry/hcengdict/represent/0, 2 pages, Date: year: 2000.

Represent. (2001). In Chambers 21 st century dictionary. Retrieved on May 9, 2014 from http://search.credoreference.com/content/entry/chambdict/represent/O, Date of publication: year: 2001.

Represent. (2011). In The American heritage dictionary of the English language. Retrieved on May 9, 2014 from http://search.credoreference.com/content/entry/hmdictenglang/represent/0, Date of publication: year 2011.

Office Action dated May 20, 2014 for U.S. Appl. No. 13/551,369, 29 pages.

Office Action dated May 30, 2014 for U.S. Appl. No. 13/277,595, 49 pages.

Office Action dated Jun. 3, 2014 for U.S. Appl. No. 13/523,770, 53 pages.

Office Action dated Jun. 6, 2014 for U.S. Appl. No. 13/447,072, 25 pages.

Office Action dated Apr. 3, 2014 for U.S. Appl. No. 13/188,295, 37 pages.

Office Action dated Jun. 18, 2014 for U.S. Appl. No. 13/305,276, 26 Pages.

Office Action dated Jun. 26, 2014 for U.S. Appl. No. 13/557,425, 24 Pages.

Office Action dated Jun. 30, 2014 for U.S. Appl. No. 13/305,267, 44 Pages.

Office Action dated Jul. 22, 2014 for U.S. Appl. No. 12/958,146, 38 Pages.

Notice of Allowance dated Jul. 22, 2014 for U.S. Appl. No. 13/525,065, 82 Pages.

(56) References Cited

OTHER PUBLICATIONS

Notice of Allowance dated Jul. 7, 2014 for U.S. Appl. No. 13/188,295, 51 pages.
Notice of Allowance dated Jul. 22, 2014 for U.S. Appl. No. 13/188,300, 49 pages.
Office Action dated Aug. 8, 2014 for U.S. Appl. No. 13/284,497, 48 pages.
Office Action mailed Mar. 11, 2016 for U.S. Appl. No. 14/743,076, 86 pages.
Notice of Allowance mailed Mar. 16, 2016 for U.S. Appl. No. 14/520,287, 23 pages.
Office Action mailed Mar. 18, 2016 for U.S. Appl. No. 13/447,072, 37 pages.
Office Action dated Apr. 5, 2016 for U.S. Appl. No. 13/188,136, 33 pages.
Office Action dated Apr. 13, 2016 for U.S. Appl. No. 14/877,915, 76 pages.
Office Action dated May 17, 2016 for U.S. Appl. No. 15/074,622, 18 pages.
Office Action mailed Jun. 10, 2016 for U.S. Appl. No. 14/548,901, 33 pages.
Office Action mailed Jun. 22, 2016 for U.S. Appl. No. 14/970,533, 84 pages.
Office Action mailed Jun. 28, 2016 for U.S. Appl. No. 15/132,220, 17 pages.
Notice of Allowance dated Jul. 19, 2016 for U.S. Appl. No. 14/952,609, 99 pages.
Office Action dated Aug. 24, 2016 for U.S. Appl. No. 14/676,066, 107 pages.
Office Action dated Aug. 25, 2016 for U.S. Appl. No. 13/447,072, 38 pages.
Office Action dated Sep. 30, 2016 for U.S. Appl. No. 14/957,525, 72 pages.
Notice of Allowance mailed Oct. 7, 2016 for U.S. Appl. No. 14/548,901, 45 pages.
Office Action dated Oct. 12, 2016 for U.S. Appl. No. 14/877,915, 34 pages.
Notice of Allowance mailed Nov. 16, 2016 for U.S. Appl. No. 15/186,410, 80 pages.
Office Action dated Dec. 28, 2016 for U.S. Appl. No. 13/447,072, 34 pages.
Office Action dated Jan. 13, 2017 for U.S. Appl. No. 14/601,800, 95 pages.
Office Action dated Jan. 26, 2017 for U.S. Appl. No. 14/877,915, 20 pages.
Office Action dated Feb. 14, 2017 for U.S. Appl. No. 14/641,242, 120 pages.
Office Action dated Feb. 15, 2017 for U.S. Appl. No. 15/191,877, 104 pages.
Office Action dated Feb. 27, 2017 for U.S. Appl. No. 15/132,220, 91 pages.
Notice of Allowance dated Apr. 10, 2017 for U.S. Appl. No. 14/676,066, 33 pages.
Notice of Allowance mailed Aug. 12, 2013, for U.S. Appl. No. 13/174,541, 40 pages.
Office Action dated Aug. 2, 2013, for U.S. Appl. No. 13/188,295, 26 pages.
Office Action dated Aug. 2, 2013, for U.S. Appl. No. 13/188,300, 38 pages.
Office Action dated Jun. 20, 2013, for U.S. Appl. No. 13/219,911, 61 pages.
Office Action dated Jul. 17, 2013, for U.S. Appl. No. 13/188,345, 27 pages.
Office Action dated Jun. 20, 2013, for U.S. Appl. No. 13/291,917, 52 pages.
Office Action dated May 31, 2013, for U.S. Appl. No. 13/523,770, 40 pages.
Office Action dated Sep. 19, 2013, for U.S. Appl. No. 13/927,020, 30 pages.
Office Action dated Oct. 2, 2013 for U.S. Appl. No. 12/958,146, 31 pages.
Office Action dated Sep. 26, 2013 for U.S. Appl. No. 13/284,456, 58 pages.
RouteFinder 3.00 for ArGIS Documentation, 2007, Routeware and Higher Mapping Solutions, 71 pages, downloaded from http://www.routeware.dk/download/routefinder_arcgis.pdf.
mySociety (Web page), "More travel-time maps and their uses", 2007, downloaded from http://www.mySociety.org/2007/more-travel-maps/, 10 pages total (including a single page Examiner's attachment showing the operation of the interactive travel-time map).
Wayback machine archive from Jan. 21, 2009 of the mySociety Web page, "More travel-time maps and their uses", Downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Office Action dated Nov. 5, 2013 for U.S. Appl. No. 13/188,136, 47 pages.
Office Action dated Sep. 18, 2013, for U.S. Appl. No. 13/284,497, 30 pages.
Office Action dated Aug. 22, 2013, for U.S. Appl. No. 13/277,595, 36 pages.
Office dated Oct. 21, 2013, for U.S. Appl. No. 13/523,770, 24 pages.
Office Action dated Nov. 5, 2013 for U.S. Appl. No. 13/188,345, 30 pages.
Office Action dated Dec. 11, 2013, for U.S. Appl. No. 13/188,295, 52 pages.
Office Action dated Dec. 24, 2013, for U.S. Appl. No. 13/188,300, 44 pages.
Office Action dated Dec. 11, 2013, for U.S. Appl. No. 13/291,917, 34 pages.
Office Action dated Jan. 15, 2014 for U.S. Appl. No. 13/219,911, 38 pages.
Office Action dated Jan. 28, 2014, for U.S. Appl. No. 12/958,146, 24 pages.
Notice of Allowance dated Feb. 14, 2014 for U.S. Appl. No. 13/284,456, 30 pages.
Office Action dated Feb. 24, 2014, for U.S. Appl. No. 13/927,020, 18 pages.
Office Action dated May 21, 2013 for U.S. Appl. No. 13/305,276, 28 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00(c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.

(56) References Cited

OTHER PUBLICATIONS

Bigham, et al., "Tilting and Beam-shaping for Traffic Load Balancing in WCDMA Network." Retrieved on Mar. 25, 2012, 4 pages.
3GPP TS 25.215 V6.4.0 (Sep. 2005) Physical Layer Measurements, Sep. 2005.
3GPP TS 25.331 V6.9.0 (Mar. 2006) RRC protocol for the UE-UTRAN radio interface, Mar. 2006.
3GPP TS 25.413 V6.9.0 (Mar. 2006) UTRAN Iu interface RANAP signalling, Mar. 2006.
Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.
Smith, et al., "Airsage Overview", (http://mikeontraffic.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.
Marko Silventoinen, Timo Rantalainen, "Mobile Station Locating in GSM" Helsinki, Finland, Last accessed on Nov. 15, 2011, 7 pages.
Office Action dated Dec. 30, 2013 for U.S. Appl. No. 13/305,267, 10 pages.
Office Action dated Mar. 25, 2014 for U.S. Appl. No. 13/488,144, 60 Pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Notice of Allowance dated Aug. 21, 2014 for U.S. Appl. No. 13/447,069, 78 pages.
Office Action dated Aug. 28, 2014 for U.S. Appl. No. 13/526,988, 83 pages.
Office Action dated Sep. 22, 2014 for U.S. Appl. No. 13/175,199, 62 pages.
Office Action dated Oct. 17, 2014 for U.S. Appl. No. 13/204,535, 47 pages.
Office Action dated Oct. 20. 2014 for U.S. Appl. No. 13/494,959, 64 pages.
Office Action dated Oct. 22, 2014 for U.S. Appl. No. 13/557,425, 59 pages.
Office Action dated Aug. 11, 2014 for U.S. Appl. No. 14/279,176, 22 pages.
Office Action dated Nov. 14, 2014 for U.S. Appl. No. 13/277,595, 74 pages.
Notice of Allowance dated Nov. 20, 2014 for U.S. Appl. No. 13/866,909, 27 pages.
Notice of Allowance dated Dec. 9, 2014 for U.S. Appl. No. 12/958,146, 48 pages.
Office Action dated Dec. 11, 2014 for U.S. Appl. No. 13/447,072, 28 pages.
Office Action dated Dec. 1, 2014 for U.S. Appl. No. 13/495,756, 76 pages.
Office Action dated Jan. 7, 2015 for U.S. Appl. No. 13/557,425, 30 pages.
Notice of Allowance dated Jan. 21, 2015 for U.S. Appl. No. 13/495,391, 98 pages.
Notice of Allowance dated Feb. 6, 2015 for U.S. Appl. No. 13/204,535, 20 pages.
Office Action dated Feb. 13, 2015 for U.S. Appl. No. 14/516,286, 62 pages.
Girardin, et al., "Digital footprinting: Uncovering tourists with user generated content." Pervasive Computing, IEEE 7.4, Oct.-Nov. 2008. 8 pages.
Steinfield, "The development of location based services in mobile commerce." ELife after the Dot Com Bust. PhysicaVerlag HD, 2004. 15 pages.
Sevtsuk, et al., "Does urban mobility have a daily routine? Learning from the aggregate data of mobile networks." Journal of Urban Technology, vol. 17, No. 1, Apr. 2010: 20 pages.
Buhalis, et al., "Information communication technology revolutionizing tourism." Tourism Recreation Research, vol. 30, No. 3, 2005. 10 pages.
Ratti, et al. "Mobile Landscapes: using location data from cell phones for urban analysis." Environment and Planning B: Planning and Design, vol. 33, 2006, 23 pages.
Office Action dated Sep. 14, 2015 for U.S. Appl. No. 13/557,425, 32 pages.
Office Action dated Apr. 16, 2015 for U.S. Appl. No. 14/521,431, 82 Pages.
Notice of Allowance dated Mar. 19, 2015 for U.S. Appl. No. 13/494,959, 41 Pages.
Notice of Allowance dated Mar. 26, 2015 for U.S. Appl. No. 14/276,688, 75 pages.
Office Action dated May 1, 2015 for U.S. Appl. No. 13/557,425, 33 pages.
Office Action dated May 14, 2015 for U.S. Appl. No. 14/530,605, 72 pages.
Office Action dated Jun. 1, 2015 for U.S. Appl. No. 13/447,072, 38 pages.
Office Action dated Jun. 2, 2015 for U.S. Appl. No. 14/516,286, 20 pages.
Office Action dated May 20, 2015 for U.S. Appl. No. 13/526,988, 52 pages.
Office Action dated Jun. 9, 2015 for U.S. Appl. No. 13/495,756, 35 pages.
Notice of Allowance dated Jul. 8, 2015 for U.S. Appl. No. 14/548,901, 125 pages.
Buford, et al, "Location Privacy Enforcement in a Location-Based Services Platform," IEEE, 2009, 5 pages.
Phillips, JR., et al., "Information Sharing and Security in Dynamic Coalitions ," ACM, 2002, pp. 87-96, 10 pages.
Moniruzzaman, et al., "A Study of Privacy Policy Enforcement in Access Control Models", Proceedings of 13th International Conference on Computer and Information Technology IEEE, 2010, pp. 352-357, 6 pages.
Office Action dated Jul. 22, 2015 for U.S. Appl. No. 13/188,136, 31 Pages.
"CELL_DCH", in INACON Glossary, published online at [http://www.inacon.de/glossary/CELL_DCH.php] retrieved on Jul. 22, 2015, 1 page.
Office Action dated Sep. 17, 2015 for U.S. Appl. No. 13/495,756, 23 Pages.
Office Action dated Sep. 18, 2015 for U.S. Appl. No. 14/641,247, 69 Pages.
Notice of Allowance dated Aug. 27, 2015 for U.S. Appl. No. 14/521,431, 39 Pages.
Office Action dated Nov. 16, 2015 for U.S. Appl. No. 13/188,136, 31 pages.
"Error", The American Heritage(R) Dictionary of the English Language, 2011, Houghton Mifflin Company, Boston, MA, 2 pages. Retrieved from [http://search.credoreference.com/contentientry/hmdictenglang/error/O] on Nov. 16, 2015.
Office Action dated Nov. 23, 2015 for U.S. Appl. No. 14/520,287, 80 pages.
Office Action dated Nov. 16, 2015 for U.S. Appl. No. 14/566,657, 87 pages.
Office Action dated Dec. 18, 2015 for U.S. Appl. No. 14/548,901, 35 pages.
Office Action dated Dec. 31, 2015 for U.S. Appl. No. 14/952,609, 32 pages.
Office Action dated Dec. 1, 2015 for U.S. Appl. No. 13/526,988, 43 pages.
Office Action dated Nov. 30, 2015 for U.S. Appl. No. 13/447,072, 45 pages.
Office Action dated Jan. 11, 2016 for U.S. Appl. No. 13/175,199, 29 pages.
Office Action dated Jun. 12, 2017 for U.S. Appl. No. 15/132,220, 25 pages.

(56) References Cited

OTHER PUBLICATIONS

Notice of Allowance dated May 8, 2017 for U.S. Appl. No. 15/466,853, 18 pages.
Office Action dated Jul. 5, 2017 for U.S. Appl. No. 15/191,877, 32 pages.
Office Action dated Jun. 19, 2017 for U.S. Appl. No. 13/447,072, 47 pages.
Office Action dated Jul. 25, 2017 for U.S. Appl. No. 15/422,147, 86 pages.

* cited by examiner

REFERENCE BASED LOCATION INFORMATION FOR A WIRELESS NETWORK

CROSS-REFERENCE TO RELATED APPLICATIONS

This patent application is a continuation of, and claims priority to each of, U.S. patent application Ser. No. 14/566,657, filed 10 Dec. 2014, and entitled "REFERENCE BASED LOCATION INFORMATION FOR A WIRELESS NETWORK," which is a continuation of, U.S. patent application Ser. No. 13/523,770, filed Jun. 14, 2012, now U.S. Pat. No. 8,938,258, and entitled "REFERENCE BASED LOCATION INFORMATION FOR A WIRELESS NETWORK," which applications are hereby incorporated herein by reference in their entireties.

TECHNICAL FIELD

The disclosed subject matter relates to reference based location information structures for a wireless radio network, e.g., receiving reference based timed fingerprint location information in a wireless radio network.

BACKGROUND

In mobile equipment networks, locating user equipments (UEs) can provide valuable additional benefits to users and opportunities for additional or improved services. Locating UEs in a wireless network can facilitate providing location-centric services or information in relation to the UE, such as E911 services, mapping services, or traffic information services, among many others. Additionally, UE location information can be employed to improve network performance, to troubleshoot networks, by law enforcement, to aggregate valuable demographic information, or nearly a limitless number of other uses. Network timing delays can include site timing delay in the wireless signal path among radio component(s) at the wireless base station and a sector antenna. Network timing delays further include delays that can arise from various mismatches (e.g., impedance mismatch) among electronic elements and components, stray capacitances and inductances, length of the antenna(s) cable(s) in base station(s); tower height of base station, signal path scattering, or "signal bounces," such as multipath or strong reflections, and the like. Propagation delay between a UE and a radio, e.g., a radio of a NodeB, is conventionally assumed to be negligible with respect to timing delay. However, signal propagation delay can be non-negligible, particularly in distributed antenna systems and low-power wireless radio cells and cause error in UE location determinations for traditional methods.

DETAILED DESCRIPTION

Figure 1:
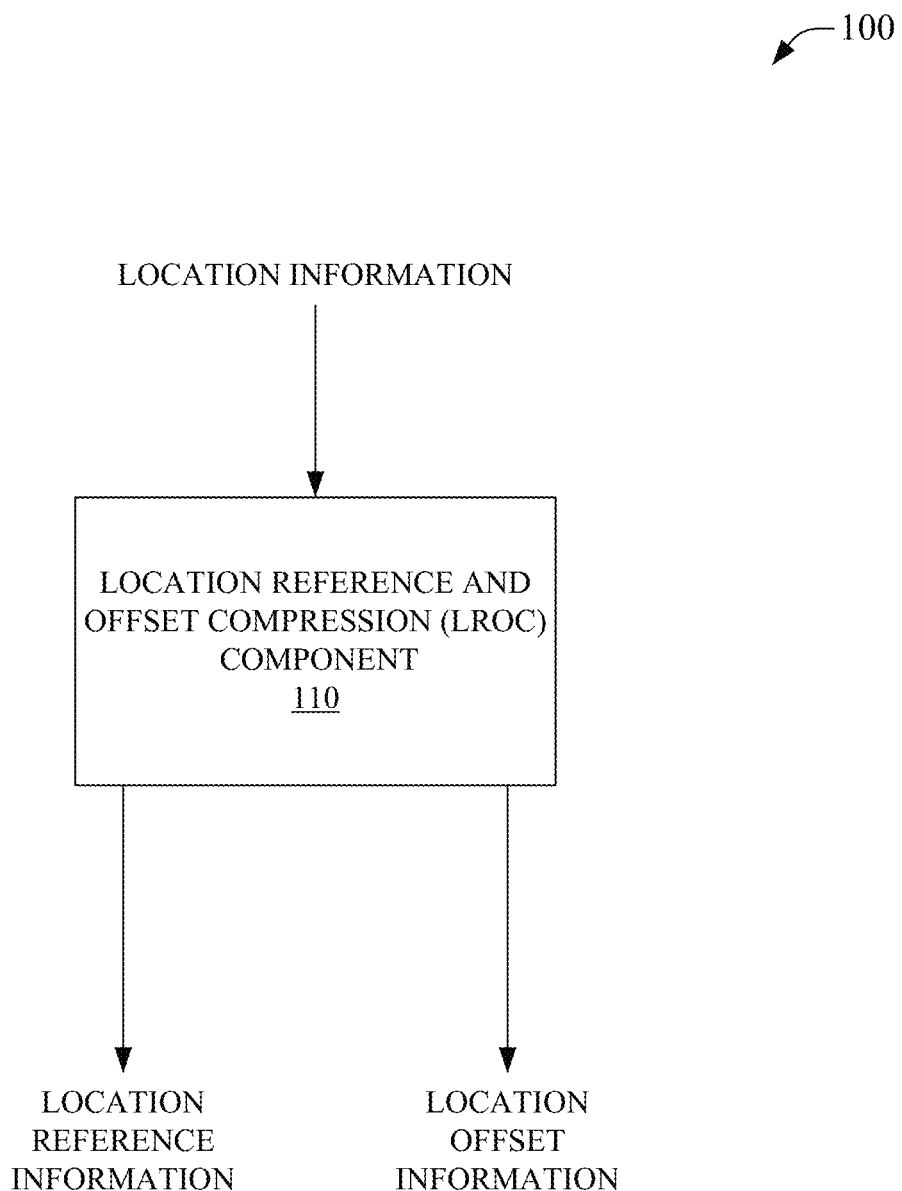
FIG. 1 is an illustration of a system that facilitates access to referenced based location information in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

By way of brief background, a network locating system (NELOS) can employ timed fingerprint location (TFL). TFL, as disclosed in U.S. patent application Ser. No. 12/712,424, filed Feb. 25, 2010, entitled "TIMED FINGERPRINT LOCATING IN WIRELESS NETWORKS", and now issued as U.S. Pat. No. 8,224,349, which application is hereby incorporated by reference in its entirety, can facilitate determining location information based, in part, on receiving timing measurements between at least a pair of wireless network radios and a device. In an aspect, determining location information in a NELOS-enabled system, e.g., a system employing TFL, benefits from communicating the determined location and supporting information to a mobile device on the wireless radio network. The presently disclosed subject matter employs reference and offset values for the determined location and supporting information to facilitate a reduced bandwidth consumption for large numbers of location information events as compared to more conventional techniques that directly communicate the determined location and supporting information. As an example, an exemplary major wireless carrier, e.g., around 100 million subscribers, could easily log 32 billion locate events per day (>370,000/sec) on a typical day. Where an exemplary conventional location information structure might comprise about 30 bytes of information, this can consume approximately 89 Mbps. Employing reference and offset values, the presently disclosed subject matter can substantially reduce bandwidth consumption.

A NELOS can employ TFL technologies that can include location information or timing information as disclosed herein and as further disclosed in more detail in aforementioned U.S. Pat. No. 8,224,349. TFL information can facilitate access to location information for a mobile device, e.g., a UE. TFL information can be information from systems in a timed fingerprint location wireless environment, such as a TFL component of a wireless telecommunications carrier. As a non-limiting example, UEs, including mobile devices not equipped with a GPS-type system, can be associated with TFL information, which can facilitate determining a location for a UE based on the timing information associated with the UE.

In an aspect, TFL information can include information to determine a differential value for a radio, e.g., a NodeB site pair, and a bin grid frame, as disclosed in more detail in incorporated U.S. Pat. No. 8,224,349. A centroid region (possible locations between any site pair) for an observed time value associated with any NodeB site pair (NBSP) can be calculated and can be related to the determined value (in units of chip) from any pair of NodeBs. When UE time data is accessed, a value look-up can be initiated (e.g., a lookup for "DV(?,X)" as disclosed in more detail in the application incorporated herein by reference). Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can return, for example, a set of bin grid frame locations forming a hyperbola correlating to the radios of the NBSP. A second lookup can then be performed for an additional relevant NBSP, using the same value DV(?,X), as an index into the data set. Continuing the example, the returned set for the look up with second NBSP can return a second set of bin grid frames. Thus, the UE is likely located in both sets of bin grid frames. Therefore, where the UE is likely in both sets, it is probable that the location for the UE is at an intersection of the two sets. Additional NBSPs can be included to further narrow the possible locations of the UE by providing additional intersections among relevant bin grid sets. As such, employing TFL information for location determination is demonstrably different from conventional location determination techniques or systems such as GPS, AGPS, triangulation or multilateration in wireless carrier environments, near field techniques, or proximity sensors.

In an embodiment, a system can include a processor and memory. The processor can facilitate the execution of computer-executable instructions stored on the memory. The processor can facilitate execution of the computer-executable instructions to determine location reference information and corresponding location offset information based on receiving location information.

In another embodiment, a method can include receiving location information. The location information can be received by a system including at least one processor. Further, the system can facilitate determining a set of location reference values and a set of location offset values based on the received location information.

In a further embodiment, a mobile device can include at least one memory that stores computer-executable instructions and at least one processor, communicatively coupled to the at least one memory, that facilitates execution of the computer-executable instructions. The execution of the computer-executable instructions can determine location information based on location reference information and corresponding location offset information.

FIG. 1 is an illustration of a system 100, which facilitates access to referenced based location information in accordance with aspects of the subject disclosure. System 100 can include location reference and offset compression (LROC) component 110. LROC component 110 can receive location information. Further, LROC component 110 can facilitate access to location reference information and location offset information. Location offset information can correspond to location reference information.

In an aspect, location information can include timestamp, international mobile subscriber identity (IMSI), latitude, longitude, altitude, method, accuracy, or other information. In an exemplary embodiment, a location event record can comprise about 30 bytes of information, which can include 10 bytes of timestamp information, 7 bytes of IMSI information, 4 bytes of latitude information, 4 bytes of longitude information, 4 bytes of altitude information, 0.5 bytes of method information, and 0.5 bytes of accuracy information. It will be noted that more or less information can be included in a location event record without departing from the presently disclosed subject matter. It will further be noted that the data volume allocated to one or more of the several pieces of information comprising a location event record can be larger or smaller without departing from the presently disclosed subject matter.

While a 30-byte location event record may not appear to consume much bandwidth in comparison to other modern consumers of wireless bandwidth, e.g., wireless video or audio transfer, wireless transfer of files to UEs, etc., when a 30-byte location event record is received frequently and by enough consumers, the multiplicative effect can result in substantial bandwidth consumption. As an example, a typical wireless carrier could see tens- to hundreds- of Mbps of bandwidth consumption for a location request event every few seconds from each of their millions of UEs in service. As such, reducing the number of bits transferred for a location event record can provide significant savings in resource allocation due to lower bandwidth requirements to support large numbers of requests. Further, it can be expected that location information will continue to be highly valued and the number of location information requests can be expected to increase in number, e.g., as more UEs have access to location information, and in frequency, e.g., as UEs request location information with a finer granularity. The presently disclosed subject matter can be valuable to location information techniques such as TFL and NELOS wherein TFL and NELOS can provide location information to UEs that would not traditionally have been able to determine their location, e.g., non-GPS enabled UEs can request location information by way of a TFL-enabled wireless network. As such, the use of TFL and NELOS techniques can rapidly burden wireless resources wherein many legacy devices are suddenly able to request location information.

LROC component 110 can facilitate access to location reference information. Location reference information can be employed to determine location information based on corresponding location offset information. LROC component 110 can also facilitate access to location offset information based on the received location information. As an example, a point along the x-axis of a plot can be defined as being at x=15 units. This same point along the x-axis can also be defined as being offset by +3 units from a reference point of x=12 units, e.g., the reference is x=12 and the offset is x=3 to yield the original information of x=15. It will be noted that the location reference information and/or the location offset information can include information for locating particular UEs in three-dimensional (3-D) space as well as providing supporting information.

In an aspect, the location reference information can be made available separate from, but still correlated to, the location offset information. In an embodiment, the location reference information can be uniform for a plurality of location offset information events. As an example, communicating location information for a set of location {x=64015; 64030; 64045} can consume 48 bits, for three 16-bit numbers. In contrast, a reference information can be x=64030 that can consume 16 bits to communicate. A correlated set of offset information {−15; 0; 15} can consume 12 bits, three 4-bit numbers. As such, the reference and offset information can require fewer bits, e.g., 28 bits, to communicate than the original location information, e.g., 48-bits. This exemplary effect can be leveraged to significantly reduce the number of bits that location offset information can consume that, in combination with corresponding location reference information, can facilitate access to location information. In an embodiment, the aforementioned 30 byte location event record can be reduces to a 12 byte location offset record and a corresponding location reference record of a size to be determined on a case-by-case basis. As an example, 12 bytes of location offset information, can include 1 byte of timestamp information, 4 bytes of IMSI information, 2 bytes of latitude information, 2 bytes of longitude information, 2 bytes of altitude information, 0.5 bytes of method information, and 0.5 bytes of accuracy information. In a further embodiment, for a stationary UE, the location offset information can be further reduced to 6 bytes because many of the values can be static and captured in location reference information. As an example, 6 bytes of information, can include 1 bytes of timestamp information, 4 bytes of IMSI information, 0 bytes of latitude information, 0 bytes of longitude information, 0 bytes of altitude information, 1 bytes of method information, and 0 bytes of accuracy information because there is no change in the latitude, longitude, altitude, or accuracy of a stationary UE.

Figure 2:
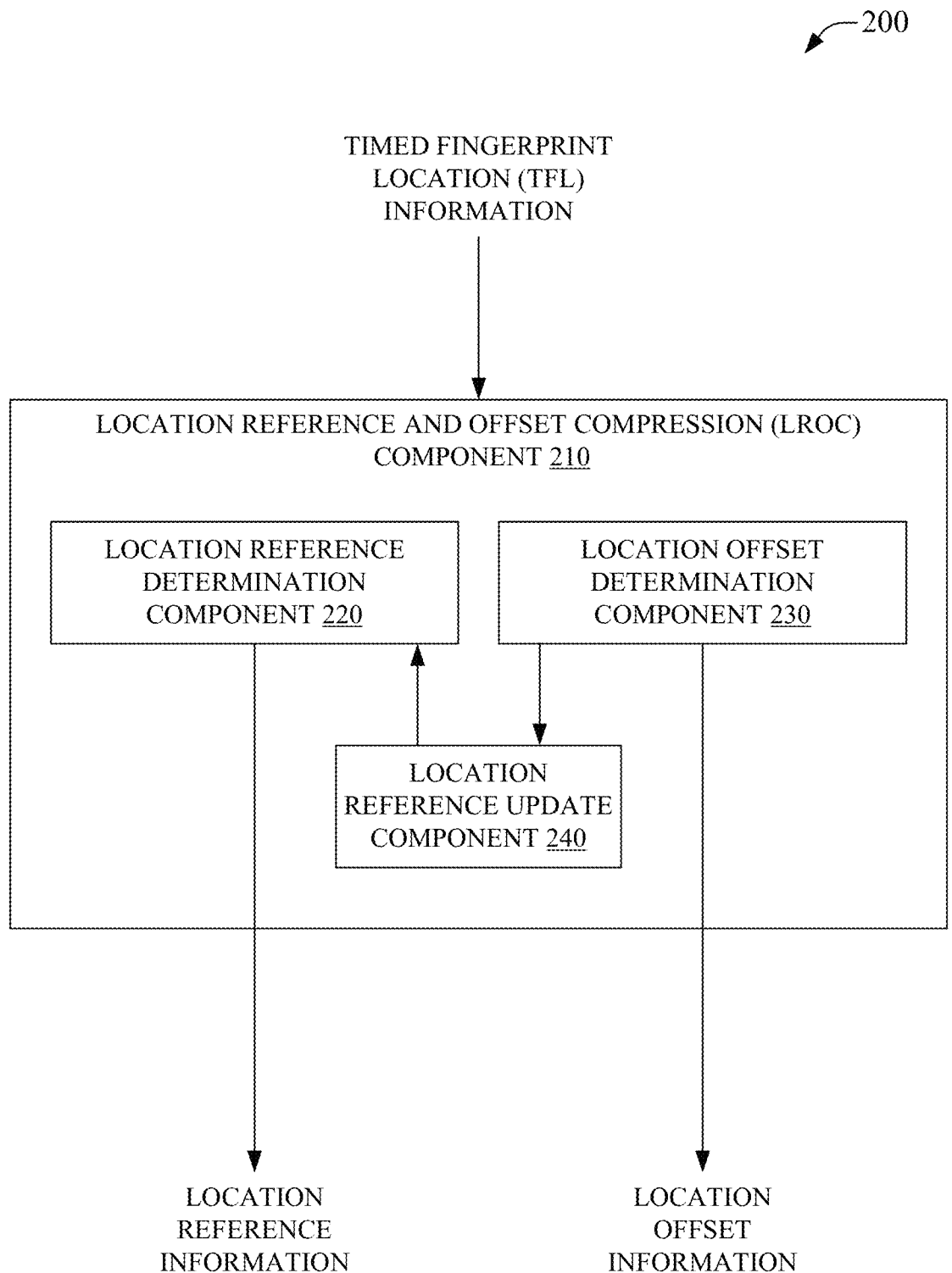
FIG. 2 is a depiction of a system that facilitates access to referenced based location information for timed fingerprint location information in accordance with aspects of the subject disclosure.

FIG. 2 is a depiction of a system 200 that can facilitate access to referenced based location information for timed fingerprint location information in accordance with aspects of the subject disclosure. System 200 can include LROC component 210. LROC component 210 can receive TFL information. Further, LROC component 210 can facilitate access to location reference information and location offset information. Location offset information can correspond to location reference information.

LROC component 210 can include location reference determination component 220. Location reference determination component 220 can facilitate a determination of location reference information based on TFL information. LROC component 210 can further include location offset determination component 230. Location offset determination component 230 can facilitate a determination of location offset information correlated to location reference information and TFL information. Location offset determination component 230 can be communicatively coupled to location reference update component 240. Location reference update component 240 can affect an update of the location reference determination information based on the location offset determination information. In an aspect, as values comprising location offset information change based on location information, it can be determined that an update of location reference information can be conducive to the location offset information remaining within predetermined parameters. As an example, where location offset information is associated with a parameter of 12-byte total size for location offset information, where the location information changes such that the offset values would consume more than 12-bytes, this can trigger an update of the location reference information to allow the location offset information values to remain under 12 bytes.

In an aspect, providing access to location reference and offset information based on TFL information can be associated with compression of TFL information. As an example of TFL information compression, where TFL information includes a timestamp for a location event request, the TFL information time stamp can include {century, decade, month, day, hour, minute, second, nanosecond}, which can consume 10 bytes. Continuing the example, compression can include a reference time that can consume 10 bytes and an offset time measured in seconds that can consume just 1 byte. As such, the reference time can be transmitted once and stored on a UE as a reference time. Thereafter, the UE can simply receive successive 1-byte offset values for subsequent location event requests. When the offset value approaches 256 seconds, e.g., where 1-byte is 8-bits and 8-bits can encode 256 seconds, then an update of the reference time can be triggered so that the offset can be reset so as not to exceed the reference time plus 256 seconds.

As a second example, the IMSI can be a 15-digit identifier that includes a 3-digit mobile country code (MCC), a 3-digit mobile network code (MNC), and a 9-digit mobile subscription identifier number (MSIN). For most UEs on a wireless carrier network, e.g., >99% of UEs, the MCC and MNC are the same. As such, the MCC and MNC values can be inferred and a truncated IMSI can be included in the location offset information. This can effectively reduce the 7-byte IMSI to a 4-byte truncated IMSI. Additionally, the excised MCC and MNC information can be included in the location reference information as desired. Further, the location offset information can include 'flag-bits' to indicate whether a 4-byte truncated IMSI of a 7-byte IMSI is included in a received as part of location offset information.

As a further example, latitude, longitude, and altitude can each be reduced from 4 bytes to 2 bytes where the offset information can be regional. As an example, 2-bytes can encode an offset of 131,000 meters in 2-meter steps. Where the location reference information can indicate a starting longitude, latitude, and altitude, the location offset information can easily encode offsets for UEs within 100-km of the location reference information values. This can reduce the 12-bytes of location information to 6-bytes of offset information.

Figure 3:
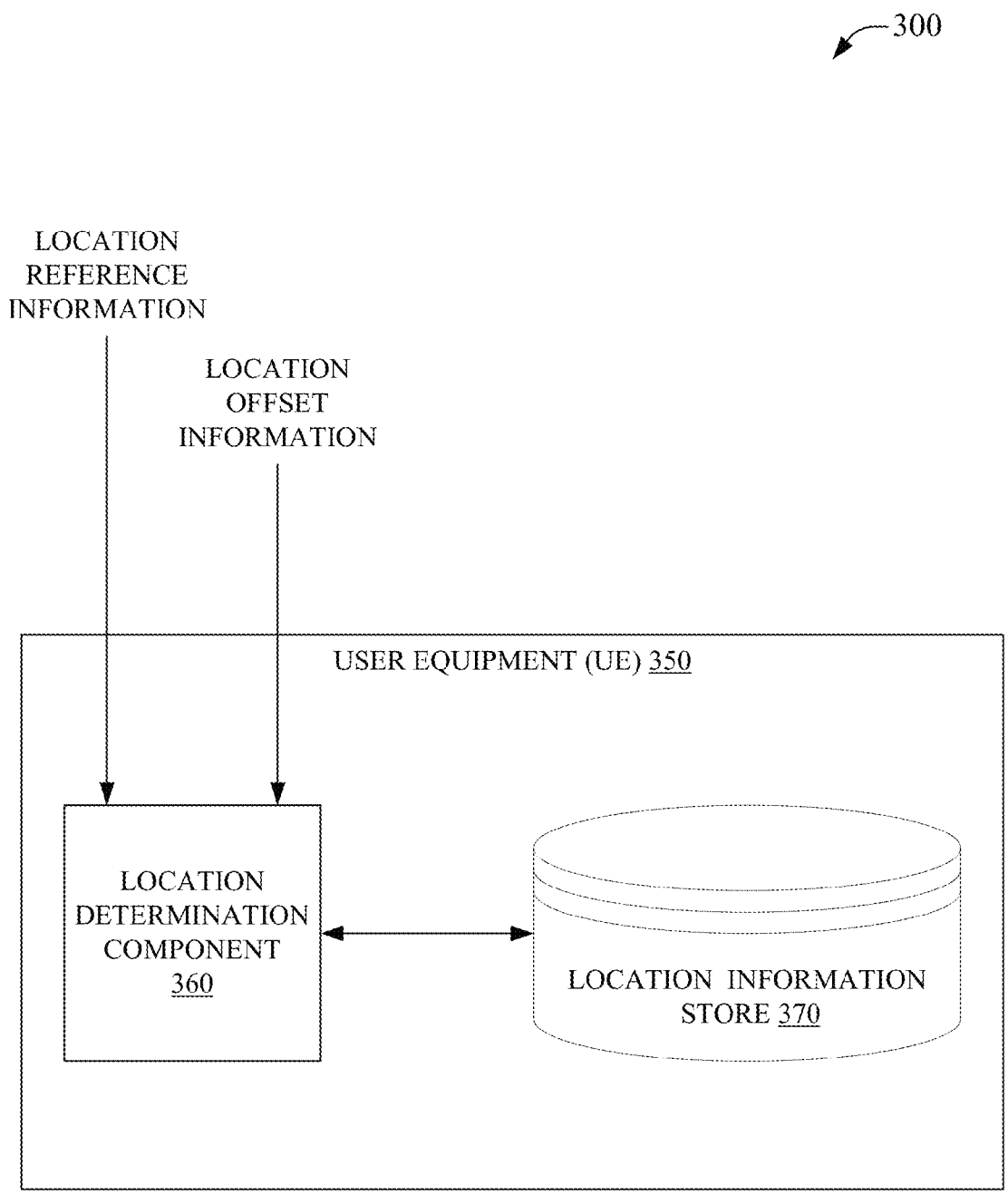
FIG. 3 illustrates a system that facilitates determination of location information based on referenced based location information in accordance with the disclosed subject matter.

FIG. 3 illustrates a system 300 that facilitates determination of location information based on referenced based location information in accordance with aspects of the subject disclosure. System 300 can include UE 350 that can receive location reference information and location offset information. UE 350 can include location determination component 360 that can determine location information, including TFL information based on received location reference information and location offset information.

UE 350 can further include location information store 370. Location information store 370 can store determined location information. Further, location information store 370 can store location reference information. Stored location reference information can be employed with received location offset information to determine location information. As an example, location reference information can be received and stored. Then, location offset information can be received that is correlated to the stored location reference information. The received location offset information and stored location reference information can be employed to determine UE location information by way of location determination component 360. As such, reference information can be received less frequently than offset information facilitating a reduction in bandwidth consumption to communication location information content. In an embodiment, TFL information can be determined by way of location determination component 360. This can facilitate communicating location information with resource cost savings for legacy devices, e.g., non-GPS enabled UEs.

Figure 4:
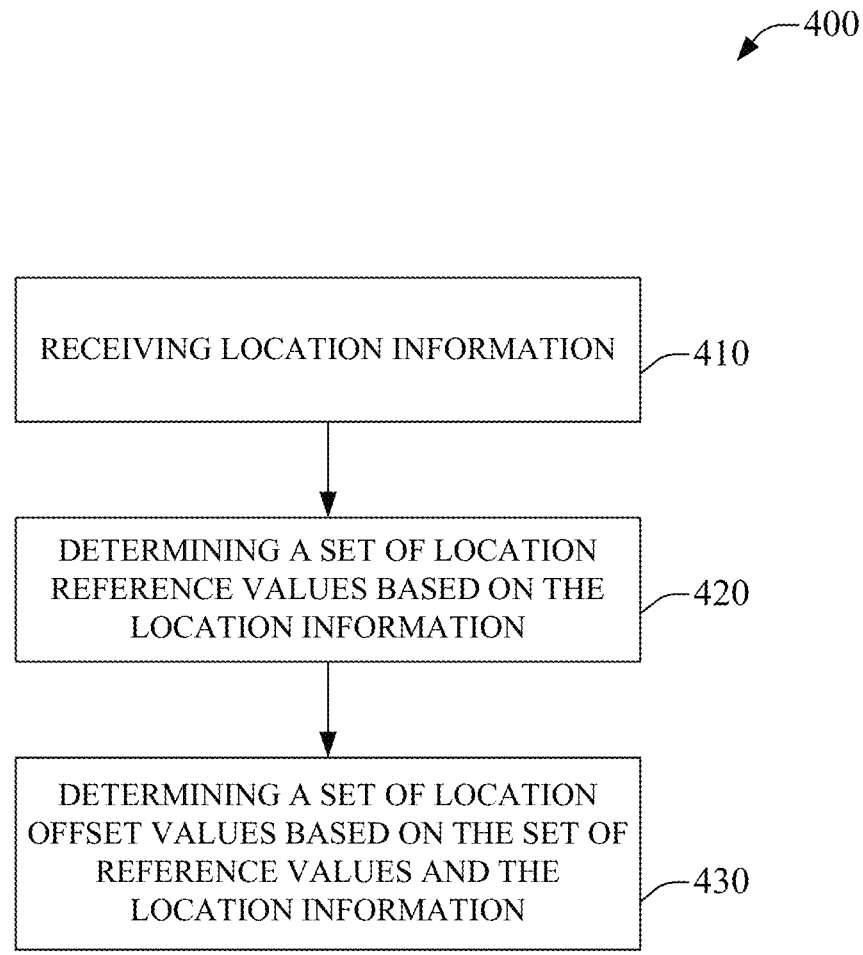
FIG. 4 illustrates a method facilitating access to referenced based location information in accordance with aspects of the subject disclosure.
Figure 5:
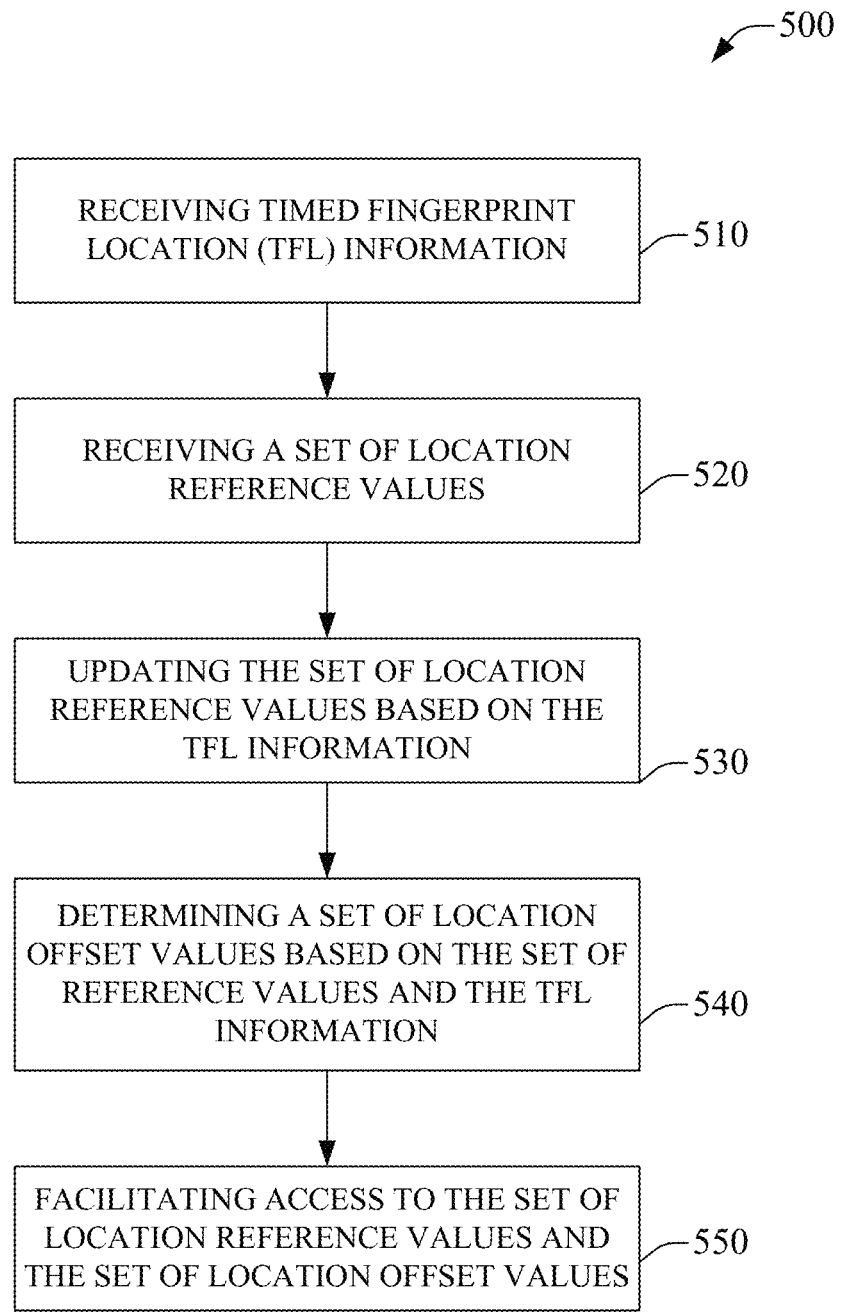
FIG. 5 illustrates a method for accessing to referenced based location information for timed fingerprint location information in accordance with aspects of the subject disclosure.
Figure 6:
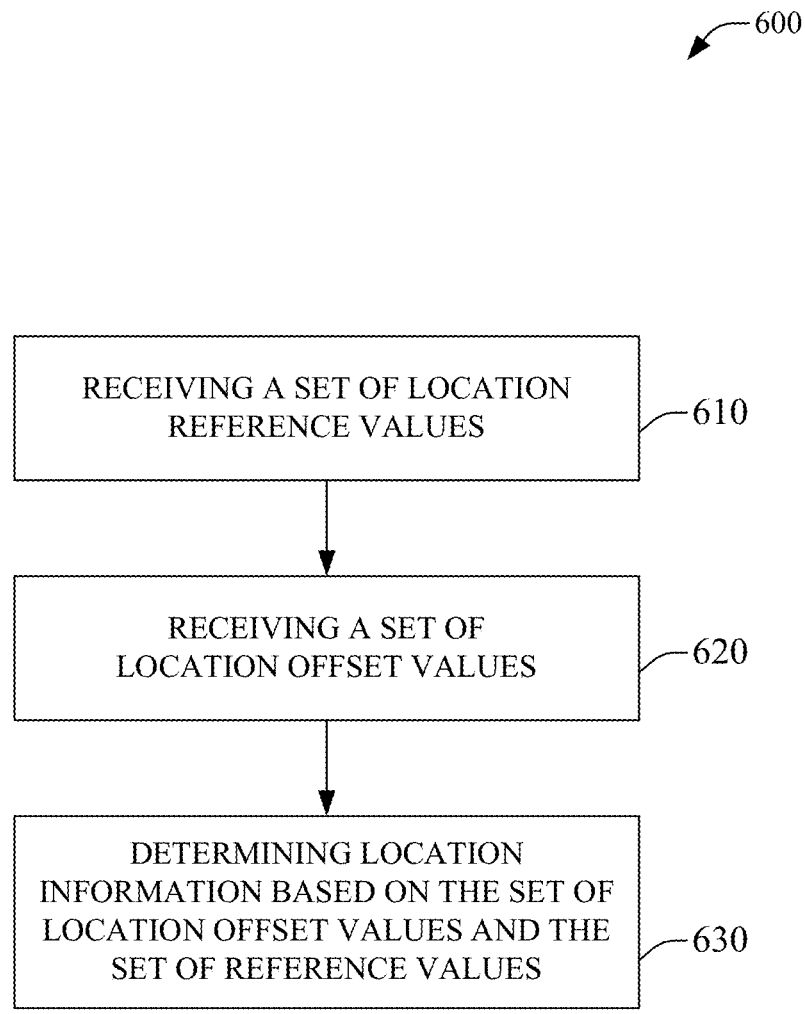
FIG. 6 illustrates a method facilitating determining location information based on referenced based location information in accordance with aspects of the subject disclosure.

In view of the example system(s) described above, example method(s) that can be implemented in accordance with the disclosed subject matter can be better appreciated with reference to flowcharts in FIG. 4-FIG. 6. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 4 illustrates aspects of a method 400 facilitating access to referenced based location information in accordance with aspects of the subject disclosure. At 410, location information can be received. At 420, a set of location reference values can be determined. The set of location reference values can be based on the location information received at 410. In an aspect, the set of location reference values can be determined to enable use of corresponding location offset values according to a predetermined scheme. As an example, a scheme can be associated with location offset information sets of 12 bytes. Based on this scheme, for received location information, location reference information can be determined to allow use of location offset information of 12 bytes. As an example, a reference latitude can be determined such that offset values for the latitude can encode latitude information within 2 bytes of the 12-byte offset information set, e.g., within about 100 km of the reference latitude.

At 430, a set of location offset values can be determined. The set of location offset values can be based on the set of location reference values determined at 420 and the location information received at 410. At this point, method 400 can end. As such, the set of location offset information can be used to update location information, in view of the set of location reference information. In an aspect, this can allow infrequent communication of location reference information in conjunction with frequent communication of location offset information to facilitate reduced bandwidth requirements as compared to communicating the location information with the same frequency at which the location offset information can be communicated. As an example, rather than communicating 30-byte location information every 5 seconds, a set of location reference information can be communicated followed by communicating 12-byte sets of location offset information every 5 seconds. Where, for example, the 12-byte offset information employs a 1-byte timestamp offset, then this should allow up to 255 seconds of offsets before an update and re-communication of the reference is needed, assuming other values do not require earlier updates. Where there is 255 seconds of 12-byte offsets, this can include 51 location offset communications at 12-bytes rather than the full 30-bytes. This can be a savings of 918 bytes for each UE in just over four minutes. In view of the large scalar values presumed to exist in wireless carrier networks, this can provide a significant reduction in consumed bandwidth and a corresponding reduction in resource expenditures by the carrier. This can be particularly relevant where large numbers of non-GPS devices can have access to location information by way of TFL/NELOS enabled systems and techniques.

FIG. 5 illustrates a method 500 for accessing to referenced based location information for timed fingerprint location information in accordance with aspects of the subject disclosure. At 510, timed fingerprint location (TFL) information can be received. At 520, a set of location reference values can be received. The set of location reference values can be based on the location information received at 510. In an aspect, the set of location reference values can be determined to enable use of corresponding location offset values according to a predetermined scheme. At 530, the set of location reference values can be updated. In an aspect, the set of location reference values can be updated based on the received TFL information.

At 540, a set of location offset values can be determined. The set of location offset values can be based on the set of location reference values and the TFL information received at 510. At 550, the set of location reference values and set of location offset values can be made accessible. At this point, method 500 can end. In an aspect, access to the set of location reference values can be expected to be much less frequent than access to the set of location offset values. Further, access to the set of location offset values can be expected to consume less bandwidth than a similarly frequent access to TFL information.

FIG. 6 illustrates a method 600 facilitating determining location information based on referenced based location information in accordance with aspects of the subject disclosure. At 610, a set of location reference values can be received. At 620, a set of location offset values can be received. The location reference and offset values can be received by way of being made accessible as disclosed elsewhere herein. At 630, location information can be determined based on the location reference and offset values received at 610 and 620. At this point, method 600 can end.

In an aspect, method 600 can be employed to determine TFL information. Wherein TFL/NELOS systems and methods can facilitate non-GPS enabled UEs to receive location information, it can be predicted that consumption of location information can substantially increase on wireless networks that are TFL/NELOS enabled. As such, resource consumption can be reduced by using reference based location information, e.g., 12-byte location offset information structures, etc., in accordance with aspects of the subject disclosure as compared to simply transmitting TFL information directly, e.g., 30-byte location event information structures, etc.

Figure 7:
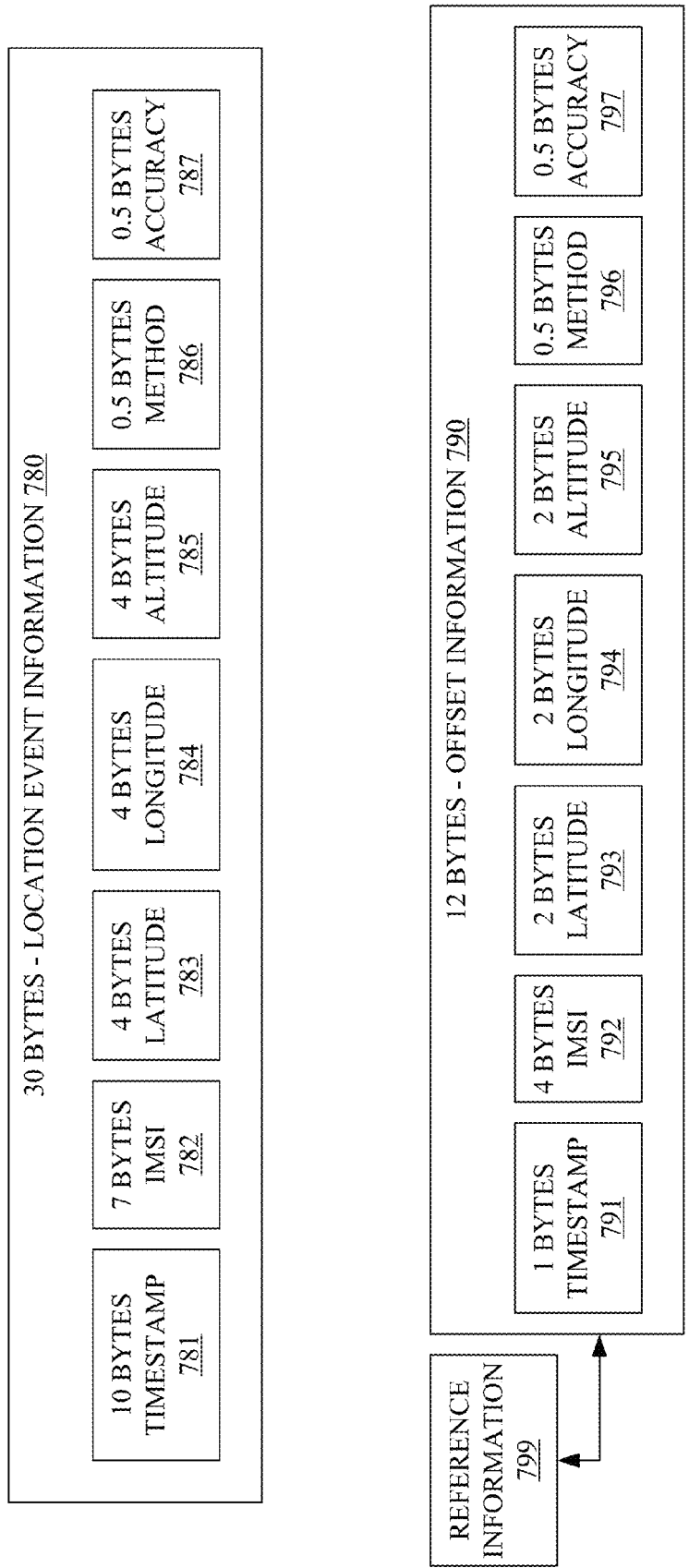
FIG. 7 is an illustration of exemplary data structures for location information in accordance with aspects of the subject disclosure.

FIG. 7 illustrates exemplary data structures 700 for location information in accordance with aspects of the subject disclosure. Exemplary data structures 700 can include 30-byte location event information (30-byte structure) 780.

30-byte structure 780 can be employed to communicate location information. 30-byte structure 780 can include 10-byte timestamp 781 that can encode centuries of time information. 30-byte structure 780 can further include 7-byte IMSI 782 that can include the MCC and MNC information that is highly redundant for the vast majority of UEs in a carrier network, e.g., greater than 99% of UEs have the same MCC and MNC values, obviating the need to communication this information except in rare circumstances. 30-byte structure 780 can also include 12-bytes of latitude (783), longitude (784) and altitude (785) information that can encode location information in the sub-meter range for any location on earth and to altitudes up to geosynchronous orbit. Moreover, 30-byte structure 780 can include 4-bits of method information (786) and 4-bits of accuracy information (787) that can be employed to identify the method of location information and the corresponding accuracy. As an example, a method can be GPS, AGPS, trilateration, TFL, etc. Each of these exemplary methods can be associated with a level of accuracy that can be indicated by the accuracy (787) value.

Further, exemplary data structures 700 can include 12-byte location event information (12-byte structure) 790. 12-byte structure 790 can be location offset information that can be correlated to reference information 799. 12-byte structure 790 can include 1-byte timestamp 791 that can encode 256 levels of time information, e.g., if timestamp 791 encodes in seconds, this can provide for just over 4 minutes of time information. 12-byte structure 790 can further include 4-byte IMSI 792, that can exclude the MCC and MNC information that is highly redundant for the vast majority of UEs in a carrier network. 12-byte structure 790 can also include 6-bytes of latitude (793), longitude (794) and altitude (795) information that can encode location information for roughly 65000 levels, e.g., at 2 meters per level, the 6-bytes can encode about 131-km for latitude, 131-km for longitude, and 131-km for altitude. Moreover, 12-byte structure 790 can include 4-bits (0.5-bytes) of method information (796) and 4-bits (0.5-bytes) of accuracy information (797) that can be employed to identify the method of location information and the corresponding accuracy. As an example, a method can be GPS, AGPS, trilateration, TFL, etc. Each of these exemplary methods can be associated with a level of accuracy that can be indicated by the accuracy (797) value.

Where the values of 12-byte structure 790 are location offset information, they can be offsets from a location reference information set, e.g., reference information 799. This can allow the relative infrequent transmission of the reference information as compared to the frequency of transmission of the offset information. It can therefore be expected that for similar rates of transmission of location information and offset information, the offset information will consume less bandwidth than the location information transmission would.

Figure 8:
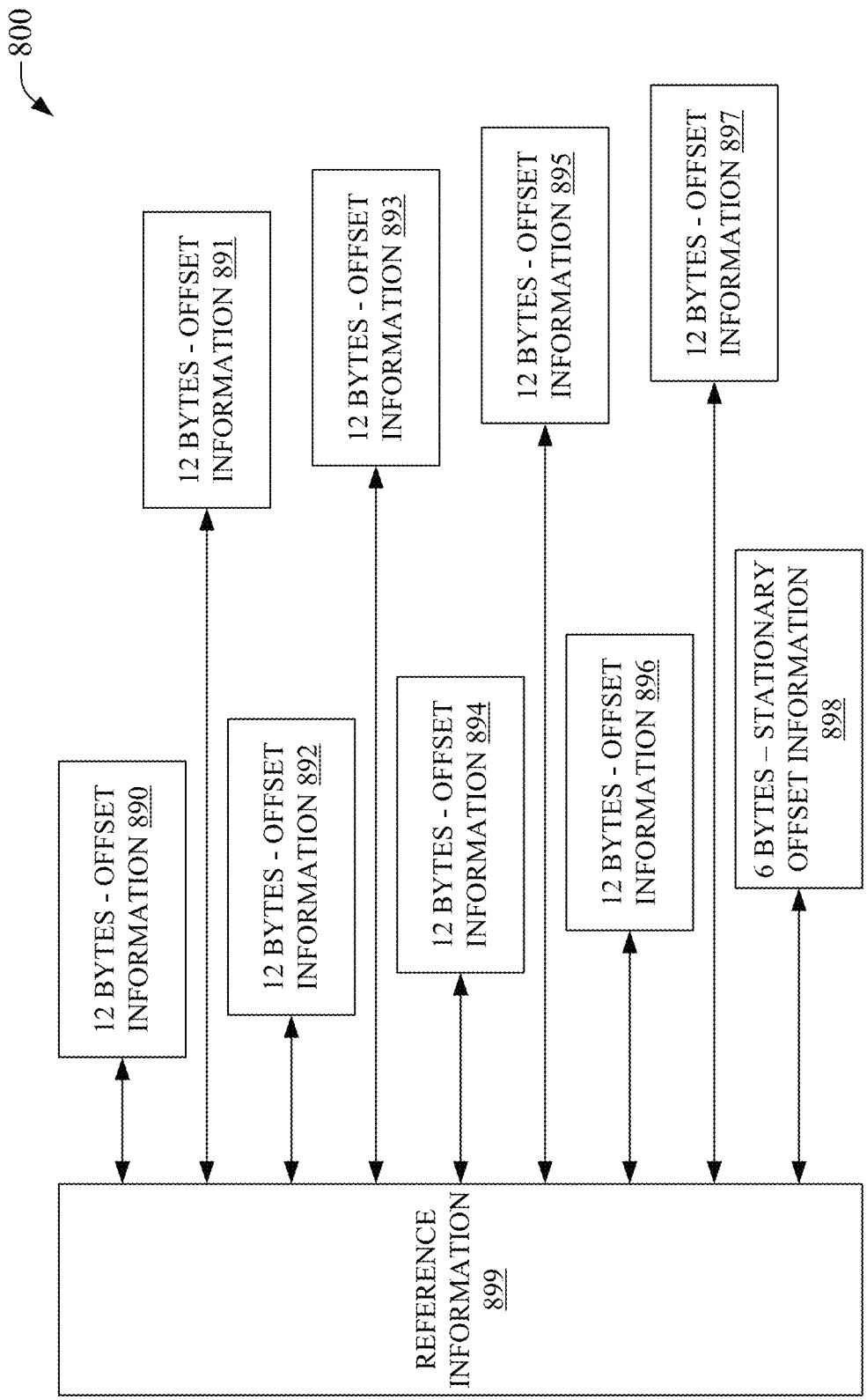
FIG. 8 is an illustration of exemplary referenced based location information data structures in accordance with aspects of the subject disclosure.

FIG. 8 is an illustration of exemplary referenced based location information data structures 800 in accordance with aspects of the subject disclosure. Location information data structures 800 can include reference information 899. Reference information 899 can include location reference information as disclosed elsewhere herein and can correlate with sets of offset information, e.g., 890-898.

Location information data structures 800 can further include 12-byte offset information 890 to 897. 12-byte offset information 890-897 can be the same as, or similar to, 12-byte structure 790 as disclosed hereinabove. 12-byte offset information 890-897 can be employed in conjunction with reference information 899 to determine location information. Location information data structures 800 can also include 6-byte stationary offset information 898. 6-byte stationary offset information 898 can be similar to 12-byte offset information 890 to 897 but can correlate to no change in position and as such can exclude values for latitude, longitude, altitude, and accuracy, although time, IMSI, and method can still be conveyed, see discussion of stationary location records with regard to FIG. 1.

It will be noted for location information data structures 800 that more than one 12-byte offset information 890 to 897 and 6-byte stationary offset information 898 can be associated with a single reference information 899 instance. This is meant to convey that offset information, e.g., 890-898, can be made accessible much more frequently than reference information, e.g., 899, to reduce bandwidth consumption while still allowing determination of location information. This can be particularly desirable in TFL/NELOS enabled systems where there can be a substantially higher level of location enabled devices than in other systems due to the inclusion of many non-GPS enabled UEs in location events enabled by TFL/NELOS.

Figure 9:
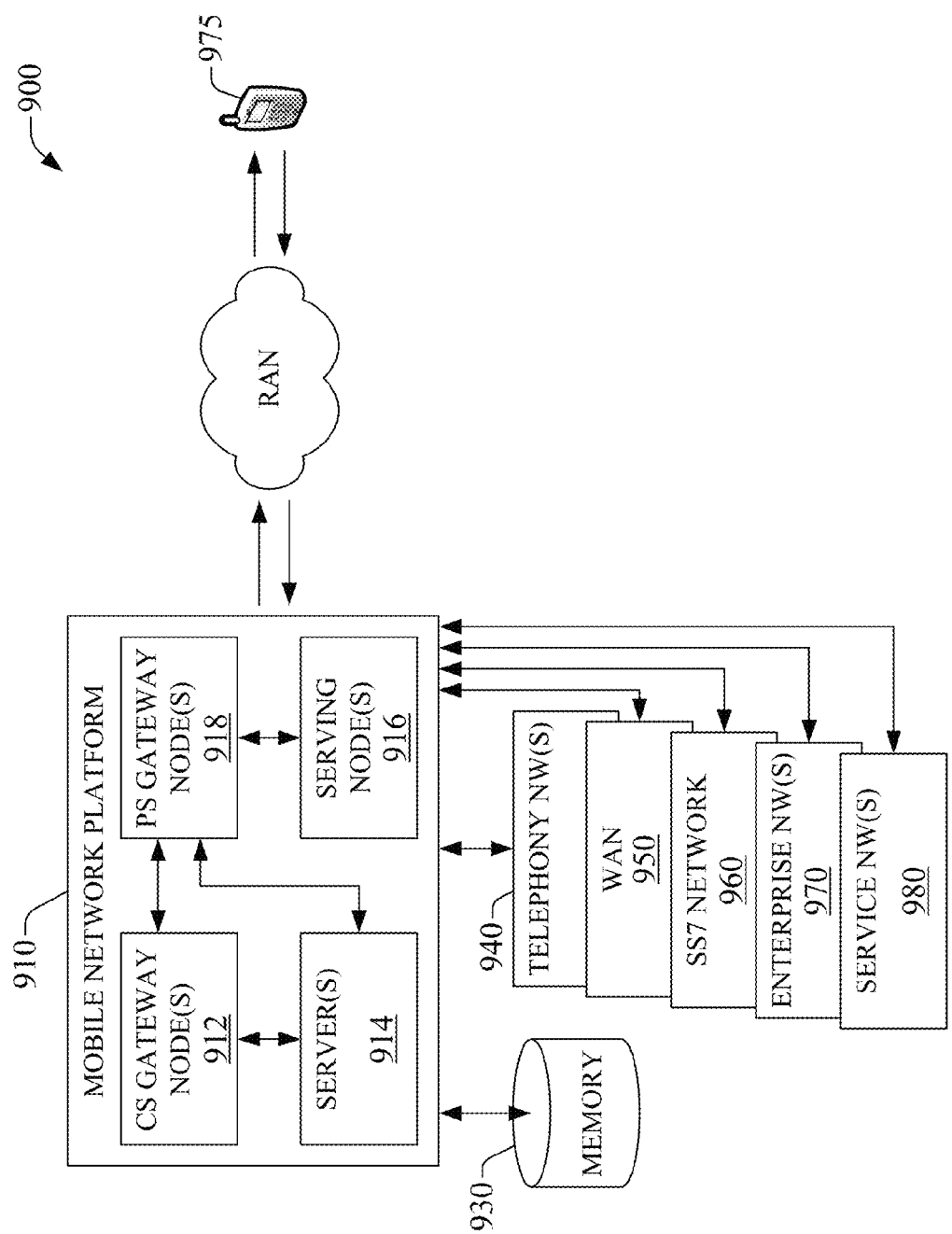
FIG. 9 is a block diagram of an exemplary embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS).

Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
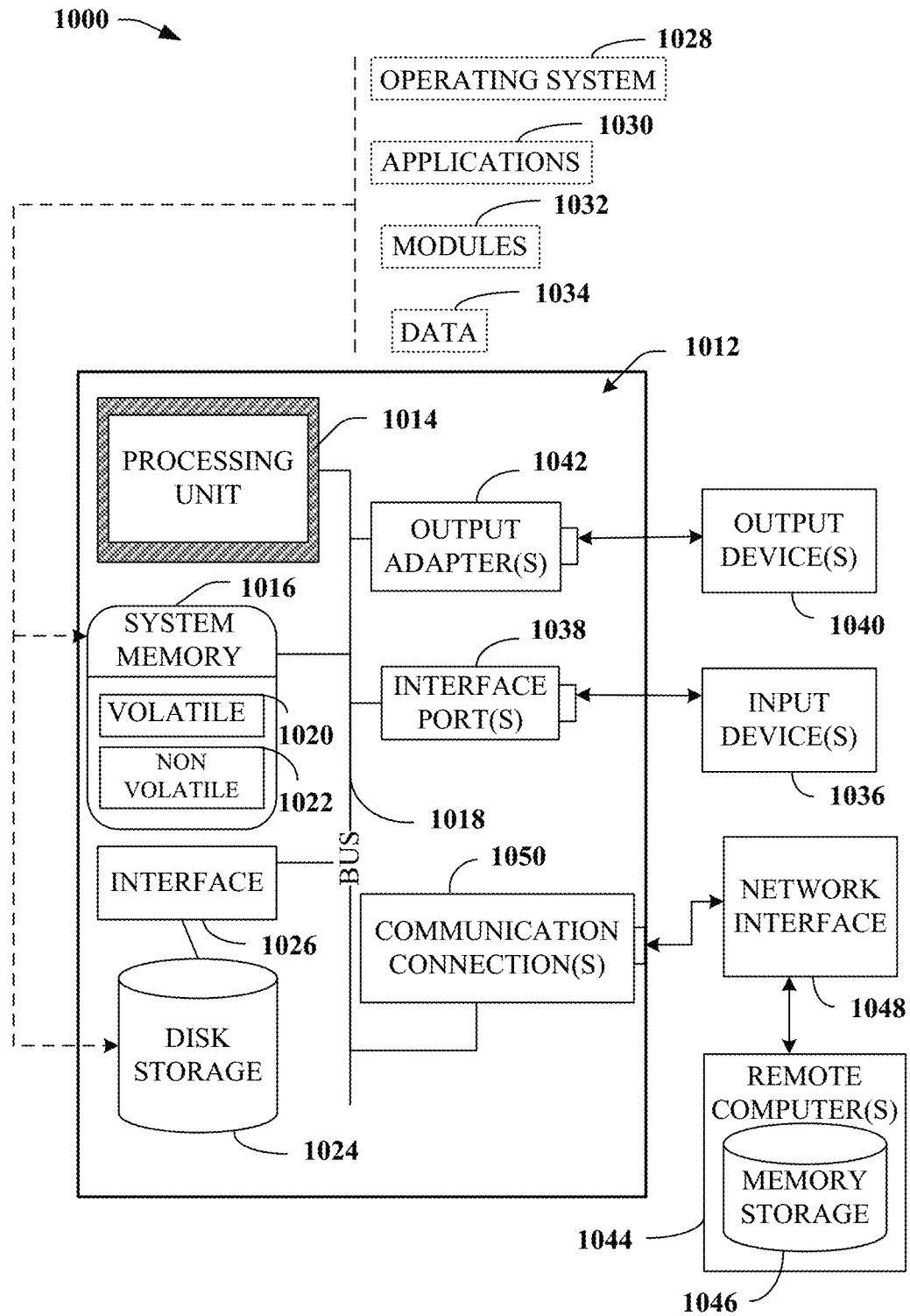
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc., that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of an LROC component e.g., component 110, 210, etc., a user equipment, e.g., UE 350, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "radio," "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network," "core," "core carrier network," "carrier-side," "carrier network," or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   determining correlated location offset information based on a change in a location of a user equipment from a first location to a second location; and
   determining a representation of the second location comprising an offset value related to the correlated location offset information, a start value related to the first location, and an identifier value resulting from modifying an international mobile subscriber identity of the user equipment, wherein the modifying comprises removing at least one digit of an international mobile subscriber identity number of the user equipment.

2. The system of claim 1, wherein the first location is determined from timed fingerprint location information.

3. The system of claim 1, wherein the second location is determined from timed fingerprint location information.

4. The system of claim 1, wherein the determining the correlated location offset information is based on timed fingerprint location information.

5. The system of claim 1, wherein the start value comprises latitude information related to the first location.

6. The system of claim 5, wherein the latitude information is represented by at least two bytes.

7. The system of claim 1, wherein the start value comprises longitude information related to the first location.

8. The system of claim 7, wherein the longitude information is represented by at least two bytes.

9. The system of claim 1, wherein the start value comprises altitude information related to the first location.

10. The system of claim 9, wherein the altitude information is represented by at least two bytes.

11. A method, comprising:
    determining, by a system comprising a processor, location offset values representing movement of a user equipment from a first location to a second location; and
    determining, by the system, compact location values comprising a first value related to the location offset values, a second value relating to the first location, and a third value related to an identification of the user equipment comprising a truncated international mobile subscriber identity of the user equipment resulting from removing at least the mobile country code from an international mobile subscriber identity number corresponding to the user equipment.

12. The method of claim 11, wherein the determining the location offset values is based on timed fingerprint location information.

13. The method of claim 11, wherein the second value comprises latitude information related to the first location.

14. The method of claim 13, wherein the latitude information is represented by at least two bytes.

15. The method of claim 11, wherein the second value comprises longitude information related to the first location.

16. The method of claim 15, wherein the longitude information is represented by at least two bytes.

17. The method of claim 11, wherein the second value comprises altitude information related to the first location.

18. The method of claim 17, wherein the altitude information is represented by at least two bytes.

19. A non-transitory machine-readable storage medium storing comprising executable instructions that, when executed by a processor, facilitate performance of operations, comprising:
 determining location offset information related to a difference between a first location of a mobile device and a second location of the mobile device; and
 enabling access to a location value associated with the second location, wherein the location value comprises an offset value related to the location offset information, a base value relating to the first location, an identity value relating an identification of the user equipment comprising a modified international mobile subscriber identity of the user equipment resulting from removing a portion of an international mobile subscriber identity number assigned to the user equipment.

20. The non-transitory machine-readable storage medium of claim 19, wherein the modified international mobile subscriber identity is represented by at least two bytes.

* * * * *